United States Patent [19]

Klees

[11] Patent Number: 4,891,714
[45] Date of Patent: Jan. 2, 1990

[54] APPARATUS FOR NON-LINEAR ERROR DIFFUSION THRESHOLDING OF MULTILEVEL VIDEO IMAGES

[75] Inventor: Kevin J. Klees, Rochester, N.Y.

[73] Assignee: Eastman Kodak Company, Rochester, N.Y.

[21] Appl. No.: 342,425

[22] Filed: Apr. 24, 1989

[51] Int. Cl.[4] .............................................. H04N 1/40
[52] U.S. Cl. .................................. 358/456; 358/458; 358/459
[58] Field of Search ............... 358/455, 298, 458, 456, 358/457, 459, 466, 75, 80; 346/1.1

[56] References Cited

U.S. PATENT DOCUMENTS

| | | |
|---|---|---|
| 4,051,536 | 9/1977 | Roetling . |
| 4,196,452 | 4/1980 | Warren et al. . |
| 4,196,454 | 4/1980 | Warren . |
| 4,258,393 | 3/1981 | Ejiri et al. . |
| 4,339,774 | 7/1982 | Temple . |
| 4,366,507 | 12/1982 | Mori . |
| 4,412,256 | 10/1983 | Heinzl et al. . |
| 4,449,150 | 5/1984 | Kato . |
| 4,680,645 | 7/1987 | Dispoto et al. ..................... 358/459 |

FOREIGN PATENT DOCUMENTS 59-204378 11/1984 Japan .

OTHER PUBLICATIONS

An Adaptive Algorithm for Spatial Grayscale, Floyd and Steinberg, proceeding of the S.I.D., vol. 17/2, second quarter 1976.

Edge Enhanced Digital Halftone, Machol, IBM, vol. 19, No. 1, Jun. 1976.

Multiple Error Correction Algorithm for Halftone, Continuous Tone and Text Production, Fox, Friedman, Schaadt, Stucki and Wong, IBM, vol. 23, No. 10, Mar. 81.

Primary Examiner—Howard W. Britton
Assistant Examiner—Kim Yen Vu
Attorney, Agent, or Firm—Dennis R. Arndt

[57] ABSTRACT

Apparatus for converting multilevel video images into a bi-level image having an accurate rendition of the original multilevel grayscale of the image. The apparatus can correct for non-linearities introduced by current error diffusion techniques.

6 Claims, 4 Drawing Sheets

APPARATUS FOR NON-LINEAR ERROR DIFFUSION THRESHOLDING OF MULTILEVEL VIDEO IMAGES

TECHNICAL FIELD

The present invention relates to a method of processing halftone images to reproduce them in black and white picture elements. An error diffusion type algorithm is used to correct for any nonlinearity and convert multilevel video images into bilevel images which present an accurate rendition of the original grayscale.

BACKGROUND ART

Many electronic systems that manipulate images in digital form use techniques to convert images with multiple graylevels into images with two graylevels (bilevel). A simple method to accomplish this conversion is to compare the multi-level input against a fixed threshold value. If the input is greater than the threshold, the output is set to the maximum output level. In the other case, the output is set to the minimum level. In this simple algorithm, the difference between the input level and the output level is ignored.

A current technique known as error diffusion makes use of this ignored difference to create a more accurate bi-level rendition of the input graylevel. This is accomplished by spatially modulating pixels in the output image. The percentage of pixels set to minimum levels in an area of the output image will represent the graylevel of the output image. This technique trades off the spatial resolution of the output system for the graylevel resolution of the input system. One of the original papers discussing error diffusion by Robert Floyd and Louis Steinberg, entitled "4.3: An Adaptive Algorithm for Spatial Grey Scale", Stanford University, Stanford, CA; SID 75 Digest, pp. 36–37, describes the use of this algorithm.

An input pixel with graylevels, is compared against a threshold, and set to either full brightness, or no brightness (on/off). After this decision, an error is calculated between the new level of the pixel and the original level of the pixel. This error is then "diffused" to surrounding pixels before they are compared with a predetermined threshold. The error is diffused to, and summed with an unprocessed pixel, and the pixel is later thresholded, generating yet another error. Thus, any one pixel in the image may be affected by errors of many previous pixels before being processed. Using current error diffusion techniques, this error is calculated by simple linear subtraction of the two levels of the pixel.

Typically, a percentage of the error signal is diffused to each of four pixels that have not been thresholded yet. These might be a pixel adjacent to the pixel being thresholded, and three pixels on the next line of the image. A set of percentages for the error distribution could be referred to as a "error kernel", and typically would add up to 100 percent. An example of such a technique would be as follows:

```
...X X X X X X X X X X      A=5/16
   X X X X X X X X X X      B=1/16
   X X X X P A O O O O      C=7/16
   O O O D C B O O O O      D=3/16
   O O O O O O O O O O...
``` where P is the pixel being processed, and the ratios define the percentage of error diffused to each of the surrounding pixels. Note that pixels on previous lines receive no portion of the error since they have already been converted to bi-level pixels. At each of the locations receiving the error, it is summed with the pixel, and a range check operation is performed to keep that data within range.

U.S. Pat. No. 4,449,150 in the name of Kato, is directed to a modification of the error diffusion technique. This modification is intended to remove an artifact that is associated with the algorithm. Certain values of inputs will produce noticeable artifacts in the forms of patterns and/or streaks in the output image. Kato solves this by randomizing the threshold used in the original algorithm.

DISCLOSURE OF THE INVENTION

In accordance with the present invention, the error signal is generated by a look-up table with the advantage that biasing of the signal to reduce truncation artifacts is possible. The generation of these error functions in an empirical task and may require some experimentation.

An electronic imaging system with eight digital bits allocated to represent the graylevel of a pixel would allow a range of 0–255 as valid pixel values. If an input value of 254 is compared to a threshold of 127, the result is an output of 255. In the prior art, this would produce an error of −1. When the error kernel described above is applied, the resulting percentages of error are all less than one. It is not possible to represent these values in an 8-bit digital fixed point number system. Therefore, a truncation error occurs, and error signals that are less than a certain amount are set to zero and do not effect the outcome of the processing.

However, with the use of a look-up table to generate these error signals, the output may be modified from a purely linear response to enable small error signals to still effect the output. Using the same example, an input of 254 would be thesholded to 255, but one error signal could be set to −1 and the other three to 0. In this manner, it would be possible to correct for truncation errors introduced by the fixed point representation used in digital hardware and would eliminate the need for the use of expensive floating point hardware.

MODES OF CARRYING OUT THE INVENTION

Figure 1:
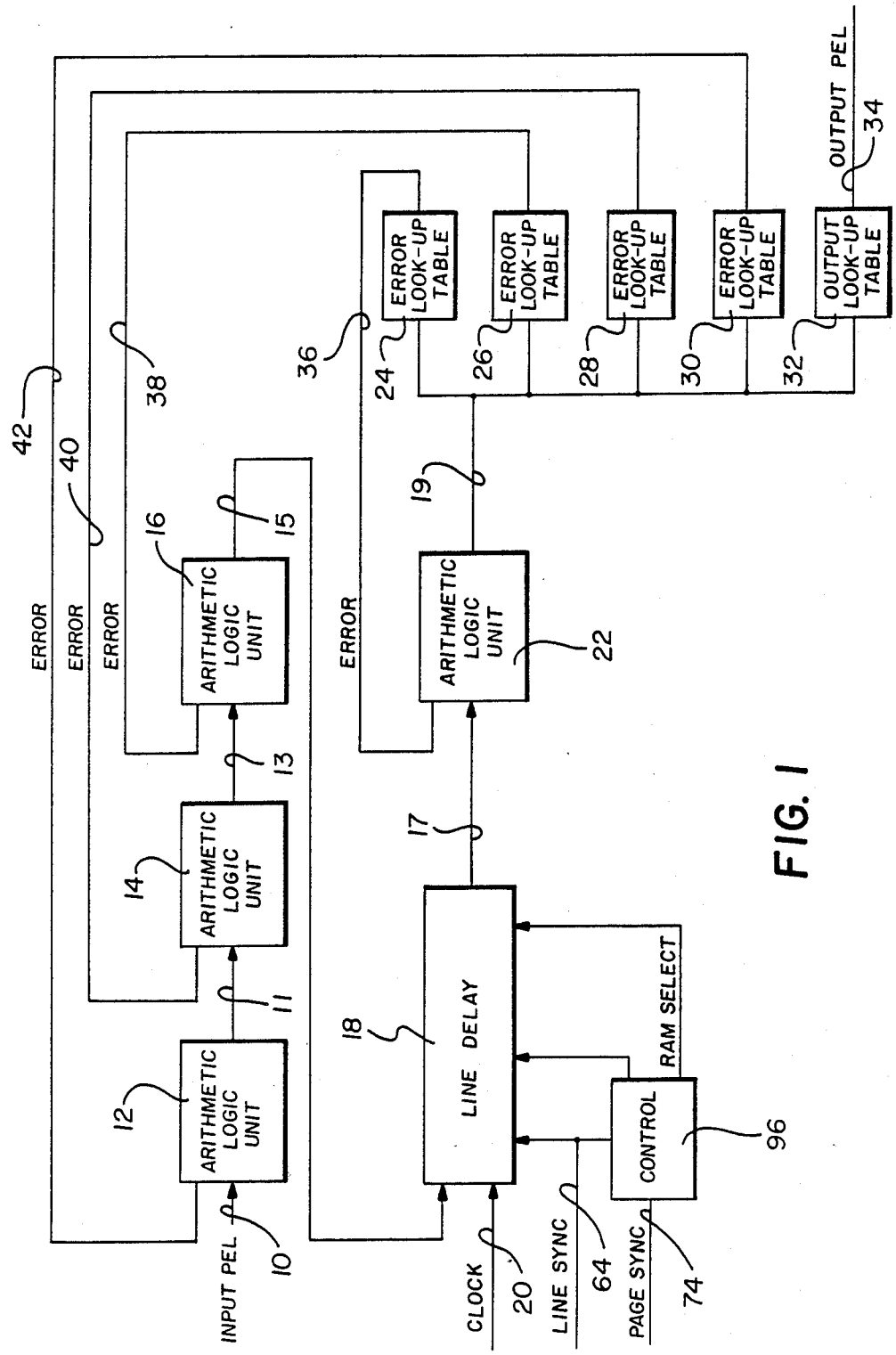
FIG. 1 shows in block diagram form apparatus according to the present invention.

The invention will be described with reference to the accompanying drawings. FIG. 1 is a block diagram of a circuit that performs non-linear error diffusion image processing on a digital video image. Image pixels are input on line 10 to three arithmetic logic units (ALU) 12, 14 and 16. The ALU's take each pixel that is serially input and either adds or subtracts an error signal that is fed back from pixels that are further downstream and are currently being processed. The particular pixels that generate the error signals have already passed through the ALU's as well as a line delay 18 (to be discussed later).

Incoming pixels are latched into the first ALU 12 along with the current error data. This error data is then either added or subtracted (depending on the sign of the error data). The result of this calculation is also checked internally within the ALU to insure that the result is within the appropriate range. This data is then latched into ALU 14 on the leading edge of the next clock signal on line 20, and the new error data is added. After three ALU's 12, 14 and 16 have operated on the input pixel, it is then delayed by one vertical scan line through the use of line delay 18. Line delay 18 functions to delay each pixel by the length of a line minus three pixels. The output of line delay 18 is then passed to a fourth ALU 22 and has a further error signal either added or subtracted with it. The value of the pixel output by ALU 22 is then sent to four error look-up tables 24, 26, 28 and 30 and an output look-up table 32 via line 19. It is this pixel value that is compared to a predetermined threshold or level and either turned on or turned off. This comparison is performed by output look-up table 32 with the resulting output PEL appearing on line 34. Such an output signal may be as simple as using the most significant bit of the pixel being processed. On the other hand, a 2 bit or 4 bit output signal can be generated if appropriate for a given application.

Four error look-up tables 24, 26, 28 and 30 are provided and receive the same 8 bit data appearing at their inputs and 8 bits of error signal are generated at their output to be fed back to corresponding ALU's 22, 16, 14 and 12 via feedback lines 36, 38 40 and 42, respectively. The generation of the error signal is performed by using the known function in the output look-up table and the input pixel value. The contents of the error look-up tables may take the form of programmable read only memory (PROM), as shown, if they are intended to be fixed. However, as an alternative, the contents of the look-up table could be downloaded from a microprocessor in accordance with the type of image being processed or the type of output device being employed to produce a hard copy of the processed video image.

It should be noted that the look-up functions loaded into the five tables are interdependent. If the output look-up table generates a 4 bit signal, it would be necessary to adjust the four error tables accordingly.

Accordingly, it can be seen that the present invention does not provide a simple linear addition but instead generates the error via the use of look-up tables; allowing greater flexibility by either making the errors nonlinear to compensate for nonlinear printing systems or the errors may be biased to accommodate such things as roundoff errors that may occur and accordingly, would affect the overall tone reproduction of the system.

All four of the ALU's in FIG. 1 are identical and are merely replicated in four places. There are basically three inputs to the ALU and those are the clock signal, the error data, and the pixel data. For example, ALU 14 has as its inputs the error signal on line 40, the clock on line 20, and the output of ALU 12 on line 11.

Figure 2:
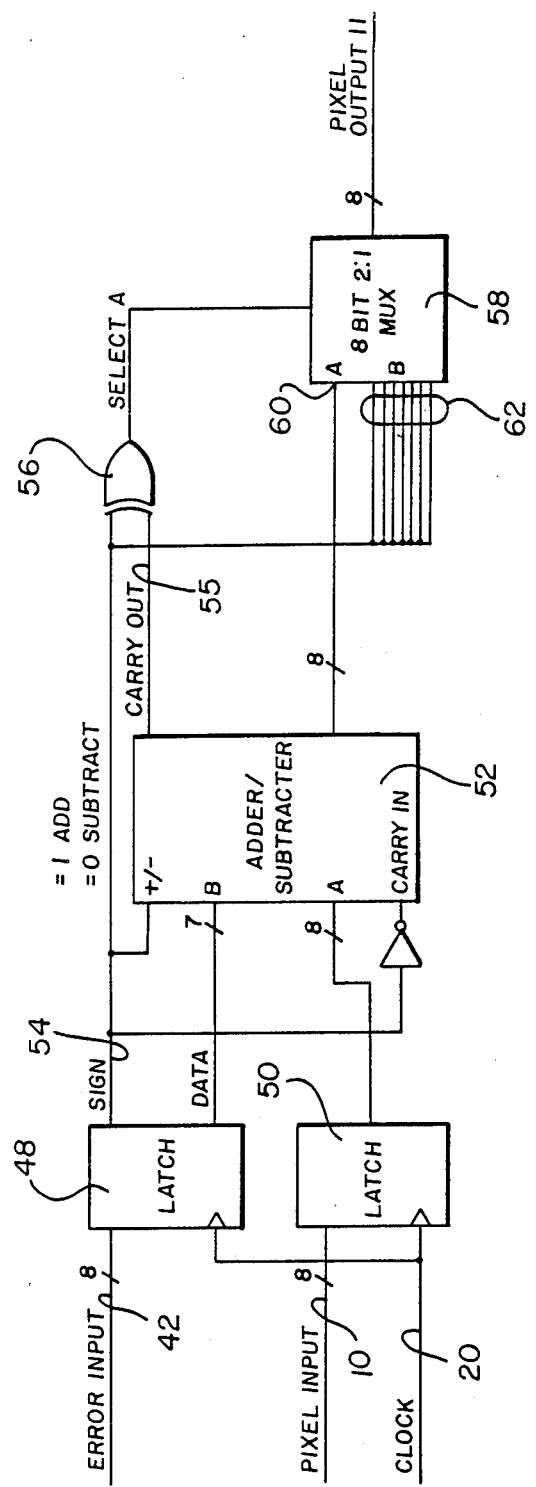
FIG. 2 shows a block diagram of an arithmetic logic unit shown in FIG. 1.

FIG. 2 illustrates in block diagram form the implementation of ALU 12 as shown in FIG. 1. There are three inputs to the ALU. An 8 bit error signal on line 42, having a sign bit with the remaining seven bits being used to indicate its level. The second input on line 10 is the pixel input which is an 8 bit unsigned signal. The third input on line 20 is a clock signal. On the leading edge of the clock signal, both the error and pixel data entering on lines 42 and 10 respectively are stored in respective latches 48 and 50. The error signal is an 8 bit signal and has a single bit indicating whether it is positive or negative with the remaining seven bits indicating the level. This error signal is generated by an appropriate error look-up table, the output of which is inputted to a corresponding ALU. The pixel data is an unsigned 8 bit signal indicating the level of that particular pixel.

The error signal and the pixel data are then fed to an adder subtracter circuit 52 which takes the two signals and either adds or subtracts them based on the sign of the error signal on line 54. By comparing the carry out on line 55 of adder subtracter circuit 52 with the sign of the error signal on line 54, a determination can be made as to whether or not the unsigned 8 bit number is within the 0–255 range in the case of addition, the carry in bit is set to zero, and a carry out bit equal to one indicates that the result exceeds 255. A complementary set of levels for subtraction will indicate a result less than zero. For example, if addition is performed and the result exceeds 255, the signal must be reduced or clipped to 255. If on the other hand, a subtraction were performed, and the signal is less than zero, it must be clipped to zero. An exclusive OR gate 56 is used to make this determination, and is used to control the output of an 8 bit 2:1 multiplexer 58.

For example, when an addition operation is performed by the adder 52 and the result is within the range, the sign bit is a one, and the carry out bit is a zero. Thus, the output of the exclusive OR gate 56 is a one, resulting in the selection of input A 60 as a result of the calculation. On the other hand, if an addition operation result is out of the range, the sign bit remains one, and the carry out bit is also a one, this results in 2:1 multiplexer 58 selecting input B 62 which is connected to the sign bit on line 54. In this case, the sign bit is a one and therefore, the output of multiplexer 58 will be an 8 bit unsigned number with all the bits set to 1's or the value 255. In a like manner, this circuit will also clip subtraction results to zero when the calculated value is less than zero.

Figure 3:
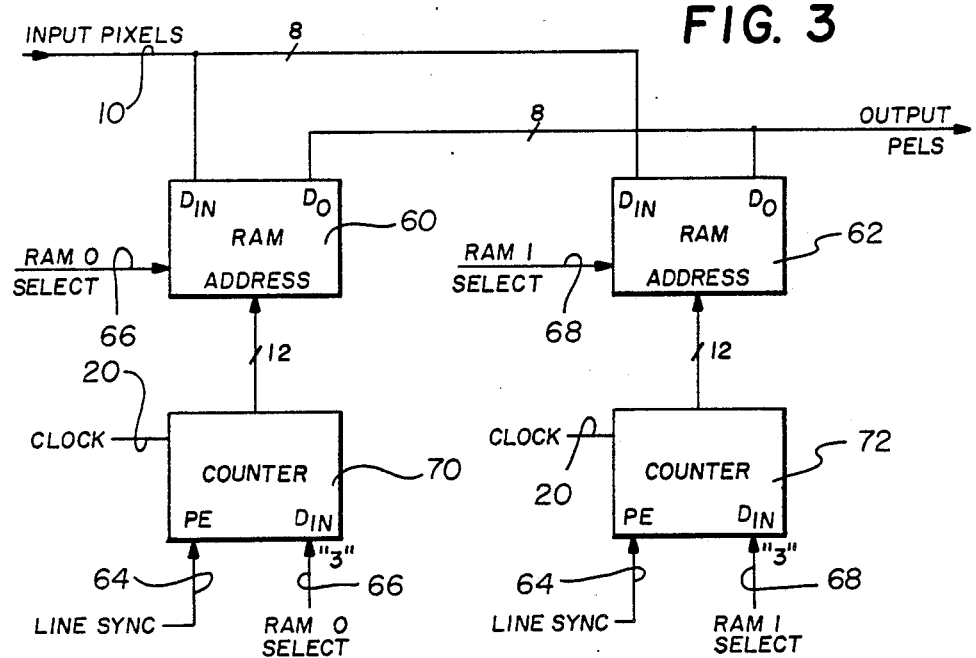
FIG. 3 shows in greater detail the line delay circuit illustrated in FIG. 1.

FIG. 3 illustrates the line delay circuitry of FIG. 1 in greater detail. Two static random access memories (RAM) 60 and 62 are used. The size of these memories is determined by the maximum line size to be processed by the circuit. In this instance, 12 address bits are used for a maximum line size of 4096 pixels. For every other image line RAM 60 receives data while RAM 62 outputs data previously written into it. This order is reversed for the intermediate lines. A one bit counter that is clocked by a line sync signal on line 64 is used to generate the RAM 0 select and RAM 1 select signals on lines 66 and 68 respectively, which are complementary.

Identical 12 bit counters 70 and 72 are used to generate address data for the RAM 60 and RAM 62, respectively. Each counter 70 and 72 is clocked by the clock line 20. An input line sync signal on line 64 is used to preload counters 70 and 72 with a number at the beginning of each scan line. The purpose of this preloaded data is to make this circuit delay the pixel input by the number of pixels in a scan line less three. This is required to synchronize the pixel data in the ALU's before and after line delay 18. When scan line data is written to RAM 60, counter 70 is preloaded with zero and when scan line data is read from RAM 62, counter 72 is preloaded with the value "3". This results in data being read three pixels later than when the data was written into line delay 18. The value three can be preloaded by connecting the two lowest bits of the data input lines of the counter 70 to the RAM 0 select line 66, and connecting all other data inputs to a zero.

Figure 4:
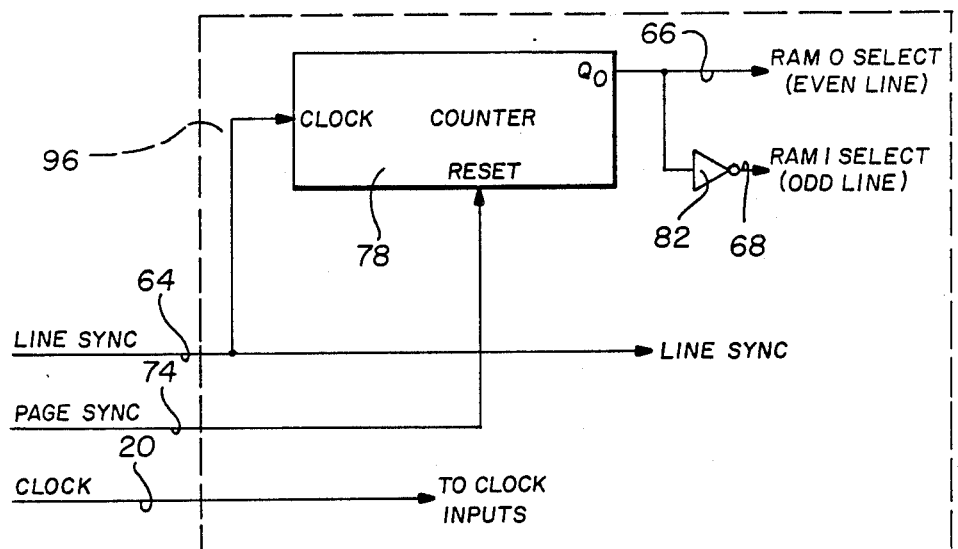
FIG. 4 shows in greater detail the circuitry for generating select signals shown in FIG. 3.

FIG. 4 illustrates the control circuitry 96 used to generate the RAM 60 and RAM 62 select signals used in FIG. 3. This circuit uses the line sync signal on line 64 and page sync signal on line 74 to generate the complementary output signals for RAM 0 select (even line) and RAM 1 select (odd line) on lines 66 and 68 respectively. The clock signal appears on line 20 and is used to clock all inputs. The circuit uses a one bit line counter 78 which generates complementary even line and odd line signals which are used to select the two RAM's 60 and 62 in line delay circuit 18 of FIG. 3. Counter 78 counts the line number of each scan line. As a result, the least significant bit of this counter toggles at the beginning of each successively occurring scan line. The output of this bit $Q_0$ on line 66 is applied as the RAM 0 (even line) select signal and through inverter 82, as the RAM 1 (odd line) select signal. This counter is reset at the beginning of each incoming image by the page sync signal appearing on input lead 74. The line sync signal appearing on input lead 64 provides the pre-set enable signal at the beginning of each scan line.

Figure 5:
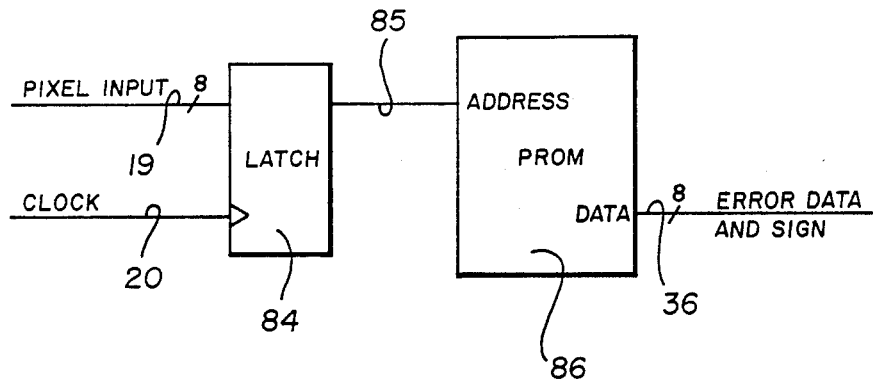
FIG. 5 shows in greater detail the circuitry of the error look-up tables shown in FIG. 1.

Illustrated in FIG. 5 in greater detail is error look-up table 24 shown in FIG. 1. Pixel data in the form of 8 bit data is input on line 19 to latch 84 where the data is stored on the leading edge of the input clock signal appearing on line 20. The 8 bit data stored in latch 84 becomes the input address on line 85 for programmable read only memory (PROM) 86 which in this instance, contains at that address the appropriate 8 bit error data which is then output on line 36. This 8 bit data includes a sign bit. Each of the four error look-up tables shown in FIG. 1 is the same; however, the contents of the PROM in each of the circuits may be different.

Figure 6:
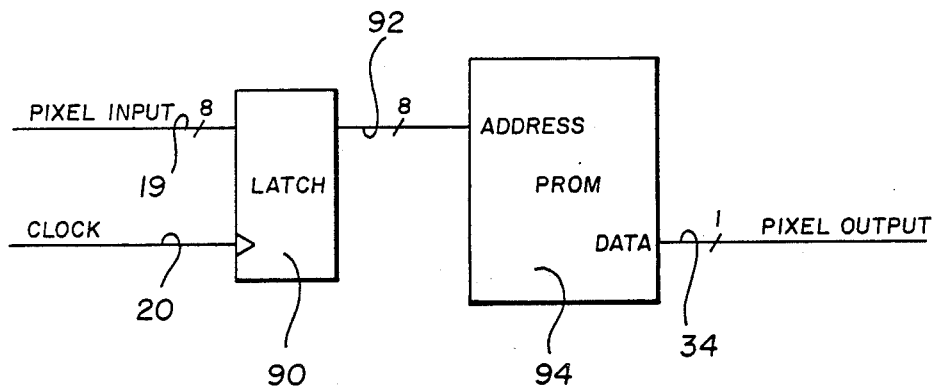
FIG. 6 shows in greater detail the circuitry of the output pixel look-up table shown in FIG. 1.

The output look-up table is shown in FIG. 6 and as can be seen, is very similar in operation to the error look-up table shown in FIG. 5. Pixel input data in the form of 8 bit data enters on line 19 and is stored in latch 90 on the leading edge of the clock signal appearing on line 20. The 8 bit data in the latch 90 becomes the address on line 92 for the PROM 94, which contains a single bit that is output on line 34. If desired, this could be simplified by just using the most significant bit of the pixel output. It should also be noted that even though both the error look-up tables 24, 26, 28, 30 and the output look-up table 32 are shown using PROM's, they could be replaced by static random access memory (SRAM's) which are loaded by an external processor during an initialization sequence. Such an arrangement would have the advantage that the contents of the SRAM's could be easily changed to accommodate a wider variety of image types. Thus, each type of image could use SRAM's that contain look-up table data appropriate for processing that particular type of image.

ADVANTAGES AND INDUSTRIAL APPLICABILITY

Use of the present invention offers advantages in the area of digital enhancement where bilevel devices are used to output computer generated graphics, for example. One field of applicability would be in medical electronics where it is often necessary to provide hard copies of the outputs of ultrasound scanners and nuclear imaging devices.

What is claimed is:

1. Apparatus for performing error diffusion thresholding of multiple level digital video images into bi-level images using non-linear error signals for error diffusion, said apparatus comprising:
   means for scanning a halftone image and detecting the density levels of individual pixels;
   means for formulating a grayscale matrix of pixels;
   means for delaying input pixels by a predetermined number of pixel locations per line;
   means for delaying input pixels by a predetermined number of scan lines;
   means for generating non-linear error values containing either positive or negative sign information;
   means for adding or subtracting said error values from said predetermined number of delayed pixel values and checking to insure that the calculated value is within a predetermined range; and
   means for generating an output value.

2. The apparatus according to claim 1 wherein said non-linear error generating means comprises a programmable read only memory containing pre-defined error functions.

3. The apparatus according to claim 1 wherein said non-linear error generation means comprises random access memories that contain predefined error values that are generated by a computer.

4. The apparatus according to claim 1 wherein said output generating means comprises a random access memory that contains a predefined value provided by a computer.

5. The apparatus according to claim 1 wherein said output generation means comprise means for outputting the most significant bit of the inputted pixel value.

6. Apparatus for performing error diffusion thresholding of multiple level digital images into a bi-level image using look-up tables to perform calculation of error signals to be diffused, said apparatus comprising:
   means for scanning a halftone image and detecting the density levels of the individual pixels;
   first array forming means for delaying the incoming pixels by a predetermined number of pixels in a scan line;
   second array forming means for delaying said pixel values by a predetermined number of scan lines;
   a programmable read only memory containing predefined error functions for generating a non-linear error value;
   means for adding or subtracting said error values to said delayed pixels in said array form means and checking to insure that the calculated value is within a predetermined range; and
   means for using a programmable read only memory containing predefined error functions for generating a non-linear error value to be combined with said current pixel and outputting after said combination, the most significant bit for the pixel value.

* * * * *